(12) United States Patent
Naoi et al.

(10) Patent No.: US 12,519,401 B2
(45) Date of Patent: Jan. 6, 2026

(54) POWER CONVERSION DEVICE

(71) Applicant: HITACHI ASTEMO, LTD., Hitachinaka (JP)

(72) Inventors: Tomotaka Naoi, Hitachinaka (JP); Masataka Nagata, Hitachinaka (JP); Youhei Nishizawa, Hitachinaka (JP); Ryuichi Niisaka, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 308 days.

(21) Appl. No.: 18/250,380

(22) PCT Filed: Sep. 16, 2021

(86) PCT No.: PCT/JP2021/034189
§ 371 (c)(1),
(2) Date: Apr. 25, 2023

(87) PCT Pub. No.: WO2022/091625
PCT Pub. Date: May 5, 2022

(65) Prior Publication Data
US 2023/0371206 A1 Nov. 16, 2023

(30) Foreign Application Priority Data

Oct. 29, 2020 (JP) ................. 2020-181943

(51) Int. Cl.
*H02M 7/48* (2007.01)
*H02M 7/00* (2006.01)
*H02M 7/04* (2006.01)

(52) U.S. Cl.
CPC ............. *H02M 7/48* (2013.01); *H02M 7/003* (2013.01); *H02M 7/05* (2021.05)

(58) Field of Classification Search
None
See application file for complete search history.

(56) References Cited

U.S. PATENT DOCUMENTS 7,123,123 B2 * 10/2006 Isurin .................. H01F 27/06
336/200
8,456,807 B2 * 6/2013 Tallam .................. H01F 3/04
174/68.2
(Continued)

FOREIGN PATENT DOCUMENTS

EP 3 664 274 A1 6/2020
JP 2012-079443 A 4/2012
(Continued)

OTHER PUBLICATIONS

International Search Report with English Translation and Written Opinion dated Nov. 22, 2021 in corresponding International Patent Application No. PCT/JP2021/034189 (9 pages).
(Continued)

*Primary Examiner* — Courtney L Smith
(74) *Attorney, Agent, or Firm* — Foley & Lardner LLP

(57) ABSTRACT

A power conversion device includes a direct-current bus bar that transmits a direct current, a capacitor element for filter connected to the direct-current bus bar, and a magnetic core that has a through hole into which the direct-current bus bar is inserted and is configured by a single member. The through hole is disposed in the magnetic core to have a first inner diameter along a width direction of the direct-current bus bar and a second inner diameter orthogonal to the first inner diameter, and the first inner diameter is larger than the second inner diameter.

5 Claims, 7 Drawing Sheets

(56) References Cited

U.S. PATENT DOCUMENTS

| | | | |
|---|---|---|---|
| 10,641,797 B2 * | 5/2020 | Okamoto | G01R 15/207 |
| 11,031,881 B2 * | 6/2021 | Kanai | H02M 7/493 |
| 2010/0079228 A1 * | 4/2010 | Halpin | H01F 37/00 |
| | | | 336/96 |
| 2016/0204597 A1 | 7/2016 | Hotta | |
| 2017/0094845 A1 | 3/2017 | Okada et al. | |
| 2017/0229971 A1 | 8/2017 | Chida et al. | |
| 2020/0203055 A1 | 6/2020 | Noda et al. | |
| 2023/0071172 A1 * | 3/2023 | Fujiwara | H03H 7/0115 |
| 2023/0163693 A1 * | 5/2023 | Awamori | H02M 7/003 |
| | | | 363/13 |

FOREIGN PATENT DOCUMENTS

| | | |
|---|---|---|
| JP | 2015-073398 A | 4/2015 |
| JP | 2017-069317 A | 4/2017 |
| JP | 2020-102913 A | 7/2020 |
| WO | WO-2016/027569 A1 | 2/2016 |
| WO | WO-2019/026339 A1 | 2/2019 |

OTHER PUBLICATIONS

Japanese Office Action dated Apr. 30, 2024, issued in corresponding Japanese application No. 2022-558910, with English translation.

* cited by examiner (a)

(b)

(a)

(b)

(a)

(b)

(c)

(a)

(b)

(c)

POWER CONVERSION DEVICE

TECHNICAL FIELD

The present invention relates to a power conversion device.

BACKGROUND ART

At present, downsizing and high output are required as functions of an inverter, and accordingly, a cooling structure for reducing heat generation of components is increasingly required, thus escalating the importance of improving the internal structure of the inverter.

As a background art of the present invention, the following Patent Literature 1 is known. Patent Literature 1 describes a magnetic core 35 having a slit 35B that connects an inner peripheral surface and an outer peripheral surface and covers a conductive bar 11, and discloses a technique that makes magnetic resistance adjustable by changing a width or the like of the slit 35B and enables occurrence of magnetic saturation to be prevented.

CITATION LIST

Patent Literature

SUMMARY OF INVENTION

Technical Problem

The flat magnetic core described in Patent Literature 1 can prevent the occurrence of magnetic saturation due to the slit 35B, but since the flat magnetic core is a split core that is not an integrated core, noise removal loss may occur in the slit that is a connection portion of the split core.

In view of the above, an object of the present invention is to provide a power conversion device that achieves both an improvement in cooling performance and downsizing while achieving an improvement in noise removal performance.

Solution to Problem

A power conversion device of the present invention is a power conversion device including a direct-current bus bar that transmits a direct current; a capacitor element for filter connected to the direct-current bus bar; and a magnetic core that has a through hole into which the direct-current bus bar is inserted and is configured by a single member. The through hole is disposed in the magnetic core to have a first inner diameter along a width direction of the direct-current bus bar and a second inner diameter orthogonal to the first inner diameter, and the first inner diameter is longer than the second inner diameter.

Advantageous Effects of Invention

It is possible to provide a power conversion device that achieves both the improvement in cooling performance and downsizing while achieving the improvement in noise removal performance.

DESCRIPTION OF EMBODIMENTS

Figure 1:
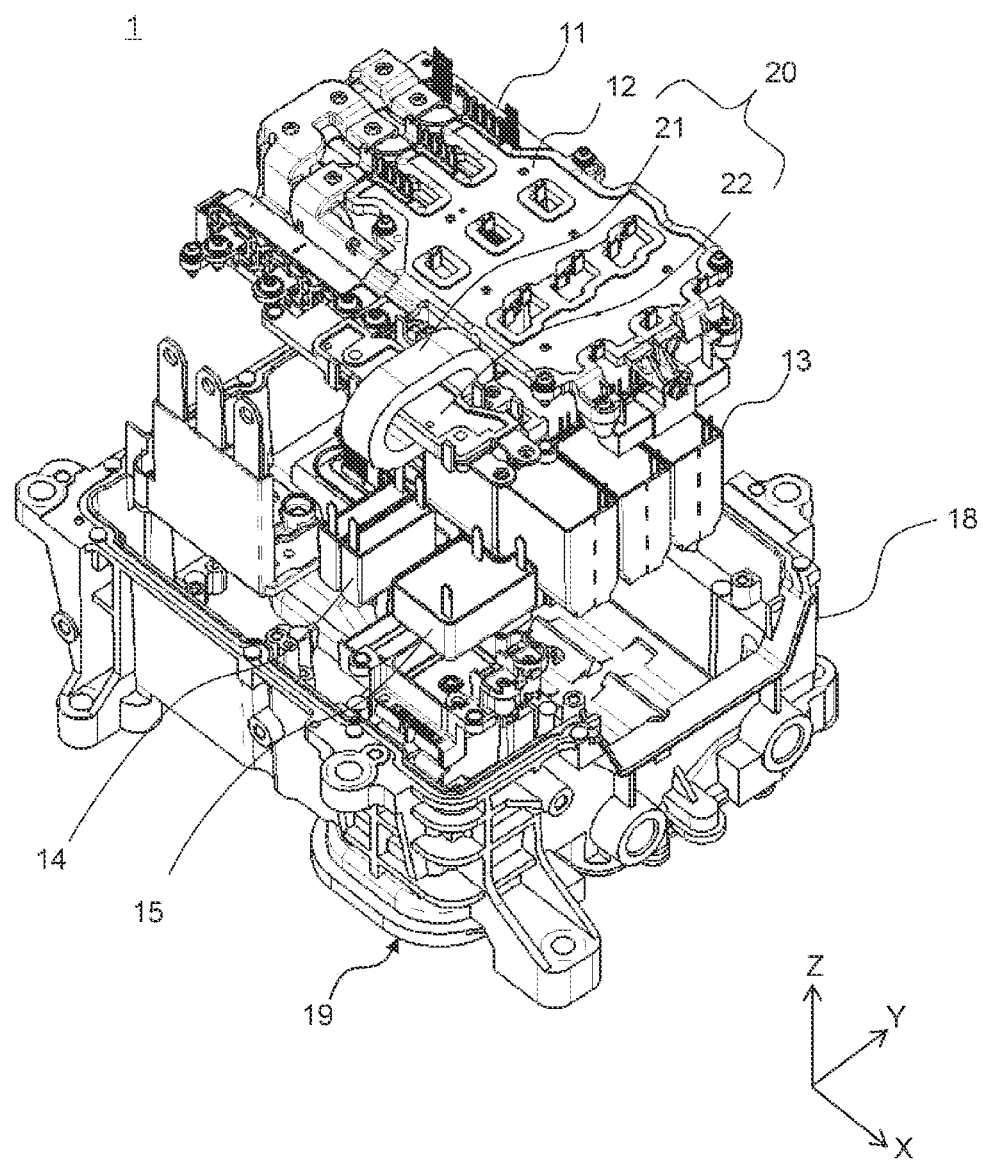
FIG. 1 is an exploded perspective view of a power conversion device according to an embodiment of the present invention.

Hereinafter, an embodiment of the present invention will be described with reference to the drawings. The following description and drawings are examples for describing the present invention, and are omitted and simplified as appropriate for the sake of clarity of description. The present invention can be carried out in various other modes. Unless otherwise specified, each component may be singular or plural.

Positions, sizes, shapes, ranges, and the like of the respective components illustrated in the drawings do not necessarily represent actual positions, sizes, shapes, ranges, and the like in order to facilitate understanding of the invention. Therefore, the present invention is not necessarily limited to the positions, sizes, shapes, ranges, and the like disclosed in the drawings.

Embodiment and Configuration of Present Invention

FIG. 1 is an exploded perspective view of a power conversion device according to one embodiment of the present invention.

A power conversion device 1 (hereinafter, an inverter 1) converts direct-current power input from a battery (not illustrated) into three-phase alternating-current power, and includes a power conversion module 11, a direct-current bus bar 12, an X capacitor 13, a Y capacitor 14, a filter circuit 15, a housing case 18 (hereinafter, a case 18), a direct-current power supply input unit 19, an electromagnetic compatibility (EMC) core 21 (hereinafter, a core 21), and an EMC bus bar 22.

The EMC bus bar 22 is a direct-current bus bar that transmits a direct current. The Y capacitor 14 is a capacitor element for filter connected to the EMC bus bar 22. The core 21 is a magnetic core constituted by a single member.

The power conversion module 11 converts direct-current power input from the battery into alternating-current power using a built-in switching element and outputs the alternating-current power. In addition, the X capacitor 13 attenuates a ripple voltage generated from the power conversion module 11. Note that although six X capacitors 13 are illustrated in FIG. 1, the number of X capacitors is not particularly limited, and in the present embodiment, at least one X capacitor 13 may be disposed in the power conversion device 1. Further, in the following description, the six X capacitors 13 are collectively referred to as X capacitors 13.

The two Y capacitors 14 and the filter circuit 15 are disposed in an X-axis direction. At least the two Y capacitors 14 are aligned in the power conversion device 1. The Y capacitors 14 and the filter circuit 15 are assembled to the EMC bus bar 22 including the core 21, and constitute an EMC filter portion 20 (hereinafter, a filter portion 20). The filter portion 20 attenuates a direct-current power supply noise generated from wiring connected to the power conversion device 1 via the direct-current power supply input unit 19.

The magnetic EMC core 21 and the EMC bus bar 22, which are EMC filter components effective for noise countermeasures (emission) of the inverter 1, are installed near the direct-current power supply input unit 19 which is a power supply input side. This improves a noise canceling effect for the outside of the inverter 1.

A conventional inverter is compared with the inverter 1 of the present invention. In the conventional inverter, a core has a round structure, and the shape of an EMC bus bar has to be made thin in accordance with an insertion place of the core. As a result, a resistance value of the bus bar is increased by narrowing the EMC bus bar, and heat is generated.

In view of this, in the present invention, the core has a structure where a hole of the core 21 is enlarged along a width direction of the EMC bus bar 22 in accordance with the width of the EMC bus bar 22 without narrowing the shape of the EMC bus bar 22. As a result, the hole shape of the core 21 is configured to allow the EMC bus bar 22 to be inserted without changing the size of the EMC bus bar 22 by narrowing the EMC bus bar 22. Adopting this structure can achieve a decrease in heat generation and downsizing of the EMC bus bar 22. Details about this will be described later.

Note that a disposing place of the core 21 is not particularly specified, but when the core 21 is disposed between the Y capacitor 14 and the filter 15, a n-type filter configuration is obtained, and the noise removal effect is improved. Therefore, it is desirable to dispose the core between the Y capacitor 14 and the filter 15.

Figure 2:
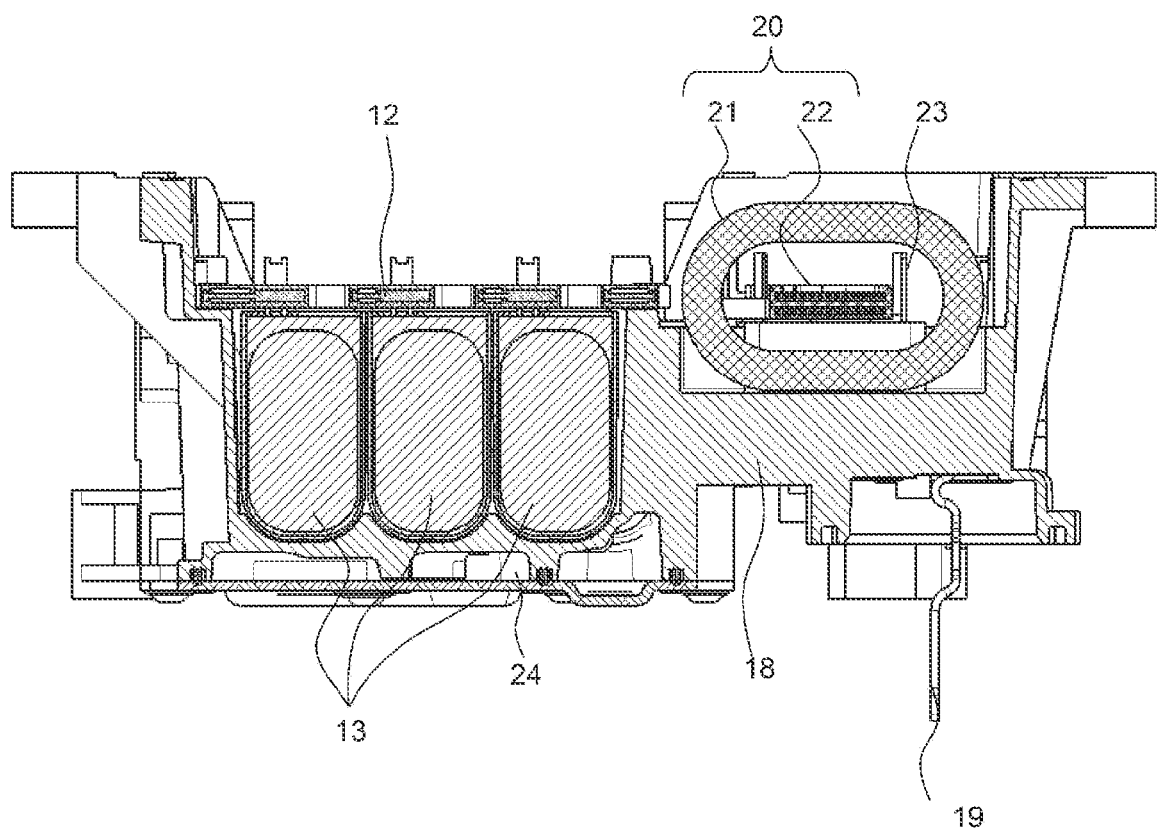
FIG. 2 is a sectional view of the power conversion device according to the embodiment of the present invention.

FIG. 2 is a sectional view of the power conversion device according to one embodiment of the present invention.

The case 18 has a water channel 24, and a refrigerant flowing inside the water channel 24 cools the entire inverter 1. The X capacitor 13 and the core 21 are brought into contact with the case 18 to dissipate heat to the refrigerant flowing through the water channel 24 via the case 18 to cool the components. The direct-current power supply input unit 19 is connected to the EMC bus bar 22.

The EMC bus bar 22 includes a welding rib 23 (hereinafter, a rib 23) to which the Y capacitor 14 and the filter 15 described above are connected by welding. The core 21 needs to allow the EMC bus bar 22, which is a direct-current bus bar, to be inserted into a through hole inside the core 21, and thus has the through hole having an inner diameter larger than the outer shapes of the EMC bus bar 22 and the rib 23.

Here, since the core 21 needs to be accommodated in the case 18, it has a flat structure. Here, in order to prevent the temperature of the core 21 from exceeding a component guaranteed temperature due to the heat generation of the core 21 and fanned heat from the EMC bus bar 22, it is important to improve the cooling performance by increasing a contact area between the core 21 and the case 18. In the present embodiment, the outer peripheral surface of the core 21 has a flat surface portion along the width direction of the EMC bus bar 22, and heat is dissipated from the flat surface portion to the case 18 acting as the heat dissipation member directly or via a heat conductive member. This makes it possible to efficiently dissipate heat from the core 21 without forming the case 18 into a special shape in accordance with the conventional round core. In addition, since the contact area is wide, the heat dissipation effect of the core 21 is enhanced as compared with the shape of the conventional core.

Further, this also makes it possible to improve cooling performance of the components using the refrigerant. In the case of the conventional round core, a thermal resistance increases as a contact area between the core and a cooling surface decreases or a distance between the core and the cooling surface increases. However, in the present invention, the core 21 is formed not into a round shape but into an approximately oval (elliptical) shape to have an increased contact area between the core 21 and the cooling surface, thus actively cooling the core 21.

In addition, since the core 21 has a through hole having an inner diameter larger than the width of the EMC bus bar 22, the core 21 can be assembled to the EMC bus bar 22 without using a special shape such as a split core and without restriction on the disposing. As a result, an ideal filter can be structured, and a noise removal loss does not occur at the connection portion of the split core portion, which has occurred in the case of the split core, thus enhancing the noise removal effect. At the same time, it is not necessary to divide the EMC bus bar 22 before and after this assembly.

Figure 3:
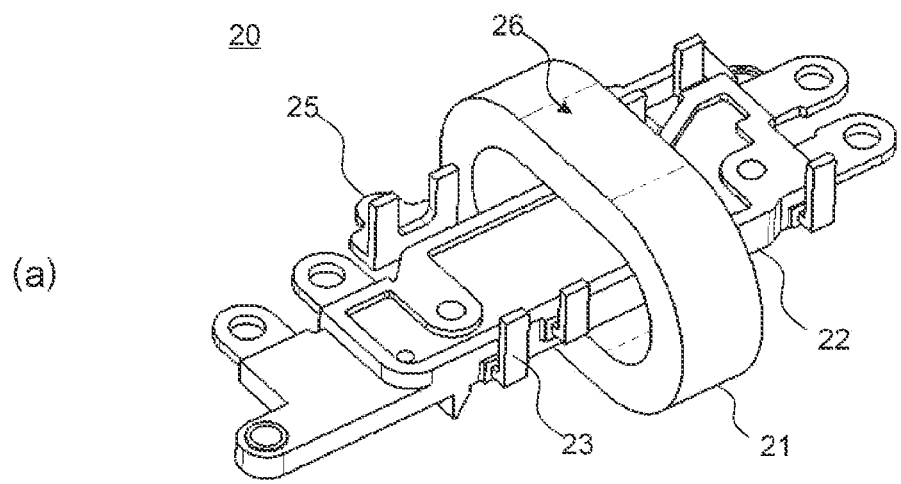
FIG. 3 is an explanatory diagram of a filter portion according to the embodiment of the present invention.
Figure 3:
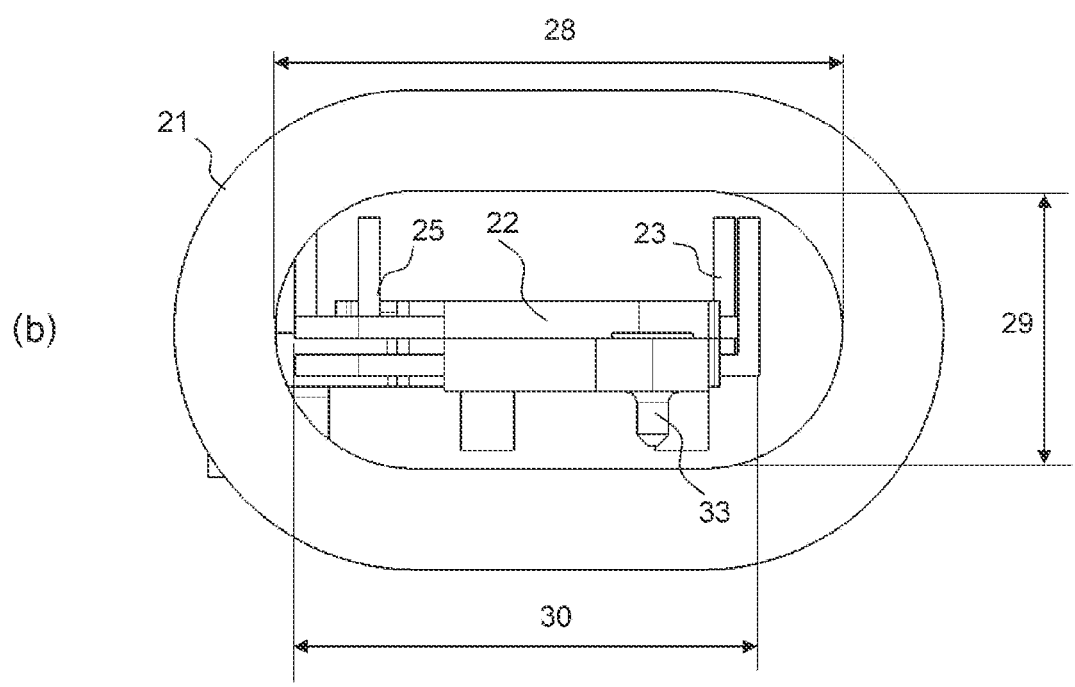

FIG. 3 is an appearance view of the filter portion according to one embodiment of the present invention. FIG. 3(a) is an appearance perspective view of the filter portion, and FIG. 3(b) is a sectional view of the filter portion.

A structure of a conventional filter portion will be described. In an EMC filter portion in a conventional inverter, when a temperature measurement test is conducted, the temperature may exceed a guaranteed temperature of the core. In view of this issue, the present invention is achieved by studying a method for reducing heat generation of the inverter 1 and preventing a temperature from exceeding the guaranteed temperature of the components in use. For example, from the viewpoint of cooling, a method for cooling the EMC bus bar 22 itself using a refrigerant or a method for cooling peripheral components using a refrigerant can be considered. As described above, an object of the present invention is to provide a structure that does not exceed the guaranteed temperature by adopting a cooling structure that does not regulate an output torque and does not reach the component guaranteed temperature.

Further, when the cooling performance of the inverter 1 is improved, the issue of downsizing needs to be solved at the same time. For example, the core 21 needs to be made as small as possible to be mounted in the case 18, but the shape of the EMC bus bar 22 needs to have a wide shape for reducing heat generation. In consideration of this, the shape of the core 21 that enables easy cooling is required. Further, for a countermeasure against the EMC, the shape of the core 21 needs to allow the EMC bus bars 22 to be inserted on a P side and an N side in a stacked manner. Therefore, it is also important that the EMC bus bar 22 is not narrowed, bent, or drawn for the purpose of downsizing. The filter portion 20 of the present invention will be described in consideration of the above viewpoint.

The EMC bus bar 22 of the filter portion 20 includes a positive side (P side) and a negative side (N side) of a direct-current power supply. As described above, the EMC bus bar 22 has a shape that is as wide as possible to be mounted on the case 18 in order that heat generation is reduced, that is, the shape such that the EMS bus bar is not reduced in width, bent, or narrowed.

The EMC bus bar 22 is characterized in that the rib 23 is disposed to facilitate a connection between the EMC bus bar 22 and the other components (the Y capacitor 14 and the filter 15). In addition, the EMC bus bar 22 has a double structure in which bus bars and resin plates are alternately stacked in order to maintain a clearance. As a result, the EMC bus bar 22 has a stacked structure having a minimum height while creepage distance of the bus bar with a high voltage is maintained. Further, since the EMC bus bar 22 has the wide shape, the resistance value of the bus bar decreases, thereby reducing heat generation. Since the EMC bus bar 22 includes a positioning rib 33 for fixing the bus bar to the case 18 alone, attachment of the EMC bus bar to the case 18 is made easy by retrofitting the positioning rib 33.

The through hole of the core 21 will be described with reference to FIG. 3 (*b*). The through hole is formed in the core 21 such that an inner diameter 28 along the width direction of the EMC bus bar 22 is longer than an inner diameter 29 orthogonal to the inner diameter 28. The inner diameter 28 of the through hole in the longitudinal direction is wider than the EMC bus bar 22. Therefore, the core 21 can be inserted into the stacked EMC bus bar 22 even if the core is not a split core. Further, by making the inner diameter of the core 21 wider than the EMC bus bar 22 in the cross section, the width of the EMC bus bar 22 can be made wide at the same time, and thus heat generation can be reduced. Furthermore, the flexibility of attaching the core 21 to the EMC bus bar 22 is enhanced.

The core 21 has a flat structure in which the lengths in the longitudinal direction and transverse direction are not identical to each other, thereby decreasing the height of the EMC bus bar 22 in the stacked direction. Further, easy mounting is enabled by making the inner diameter dimension of the through hole of the core 21 larger than the rib 23 and the positioning rib 33 for mounting to the case 18. Accordingly, since the cross-sectional dimension of the EMC bus bar 22 is shorter than the inner diameter 28 in a direction along the inner diameter 28 and shorter than the inner diameter 29 in a direction along the inner diameter 29, the EMC bus bar 22 can be inserted at the time of assembling the core 21.

A ground (GND) bus bar 25 to which the Y capacitor 14 is connected is connected to the EMC bus bar 22 after the EMC bus bar 22 is inserted into the through hole of the core 21, as a component separate from the EMC bus bar 22. In this way, the GND bus bar 25 does not hinder the insertion of the EMC bus bar 22 into the core 21, thus decreasing the size of the core 21.

Further, in the core 21, the outer peripheral surface of the through hole in the longitudinal direction is a flat surface portion 26 which is a flat surface along the long inner diameter 28, and the area which can make contact with the case 18 and the other components is increased while the height of the EMC bus bar 22 in the stacked direction is controlled. As a result, the filter portion 20 is directly placed on the case 18 or placed on the case 18 with the heat conductive member being interposed therebetween, and thus the case 18 can serve as a heat dissipation member of the filter portion 20.

In addition, with this shape, the heat generation of the EMC bus bar 22 is reduced, and the fanned heat to the peripheral components is reduced, thereby expanding the usable range in a place environment. Further, the improvement in the cooling performance also enables the improvement in a usable temperature range. In addition, this leads to a decrease in the stacked direction (height), and enables the mounting to the case 18. Finally, this contributes to downsizing of the power conversion device 1, and further output is enhanced by the improvement in the cooling performance due to widening of a cooling area, the decrease in the height direction due to shape change, and the reduction in heat generation.

Modified Example

Figure 4:
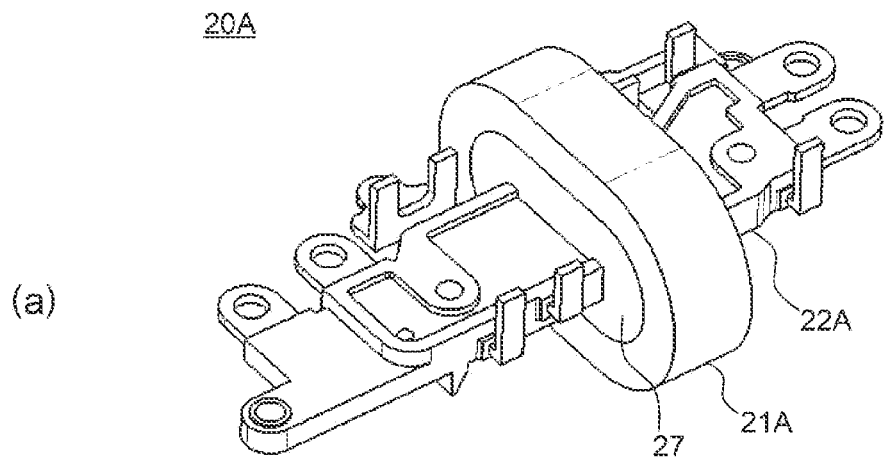
FIG. 4 is an explanatory diagram of the filter portion including a resin portion.
Figure 4:
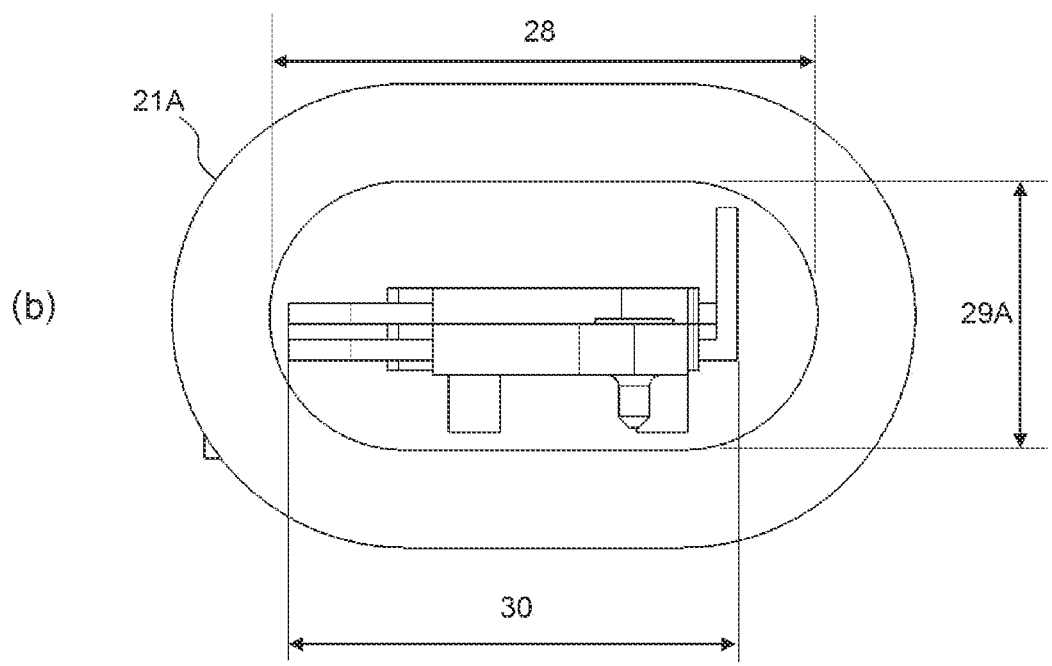

FIG. 4 is an appearance perspective view of the filter portion of FIG. 3 on which a resin portion is disposed. FIG. 4(*a*) is an appearance perspective view of the filter portion on which the resin portion is disposed, and FIG. 4(*b*) is a sectional view of the filter portion on which the resin portion is disposed.

A resin portion 27 as a resin sealing member for integrally sealing and fixing an EMC bus bar 22A having the stacked structure is disposed in the through hole of a core 21A together with the EMC bus bar 22A. As a result, the core 21A can be easily attached and positioned to and on the EMC bus bar 22A. Note that since the purpose is positioning, the resin portion 27 is used only for the purpose of temporary fixing. Therefore, when the resin portion 27 is inserted into the through hole of the core 21A, a gap may be present between the resin portion 27 and an inner wall of the core 21A. Obviously, the resin portion 27 may be used for the purpose of final fixing.

Figure 5:
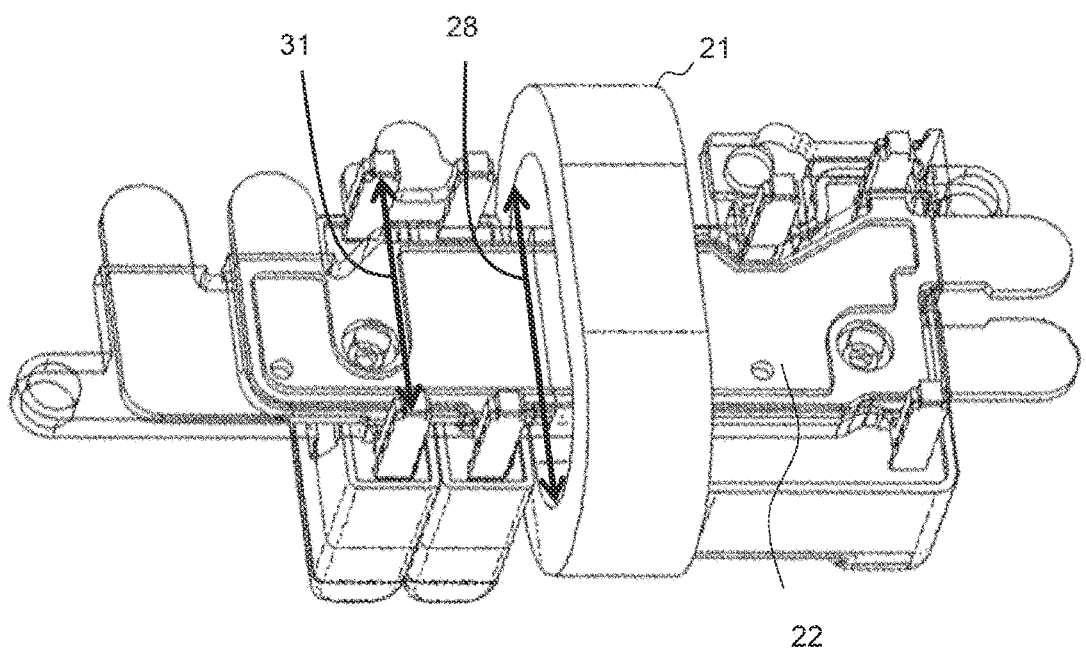
FIG. 5 is a perspective view of the filter portion according to the embodiment of the present invention.

FIG. 5 is a side view of the filter portion according to one embodiment of the present invention.

Even when the filter portion 20 includes the capacitor element (Y capacitor 14) for filter, the inner diameter 28 of the through hole of the core 21 in the longitudinal direction is larger than a positive-negative electrode terminal distance 31 (terminal distance between the rib 23 and the GND bus bar 25). Thus, the core 21 can be easily assembled to any position in the filter portion 20.

Figure 6:
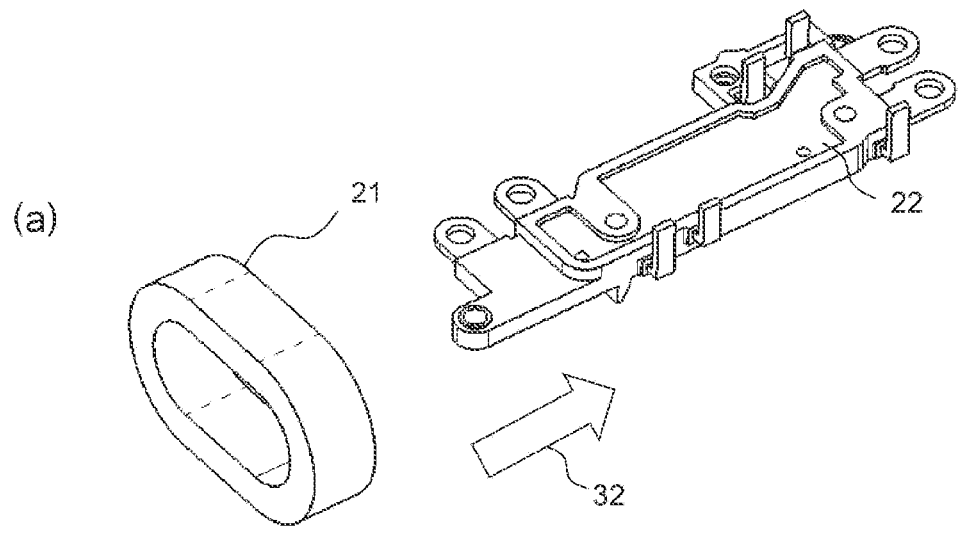
FIG. 6 is a diagram explaining assembly of the filter portion according to the embodiment of the present invention.
Figure 6:
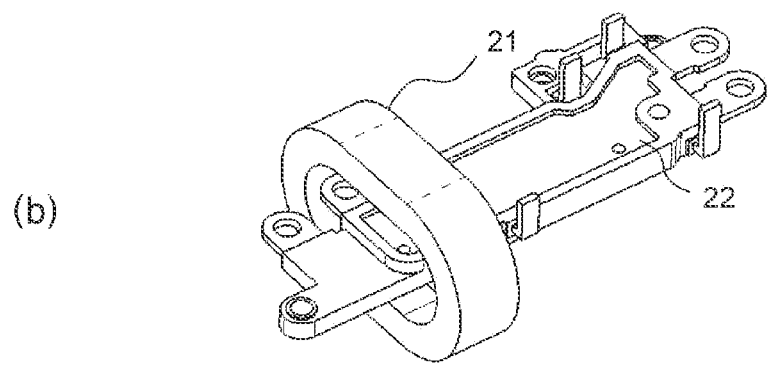
Figure 6:
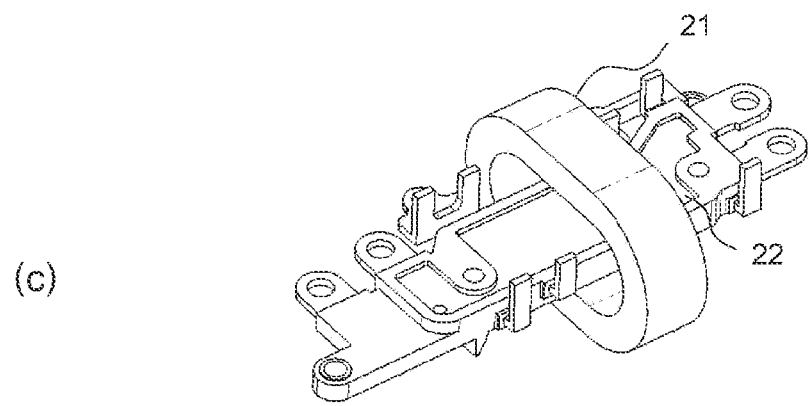
Figure 7:
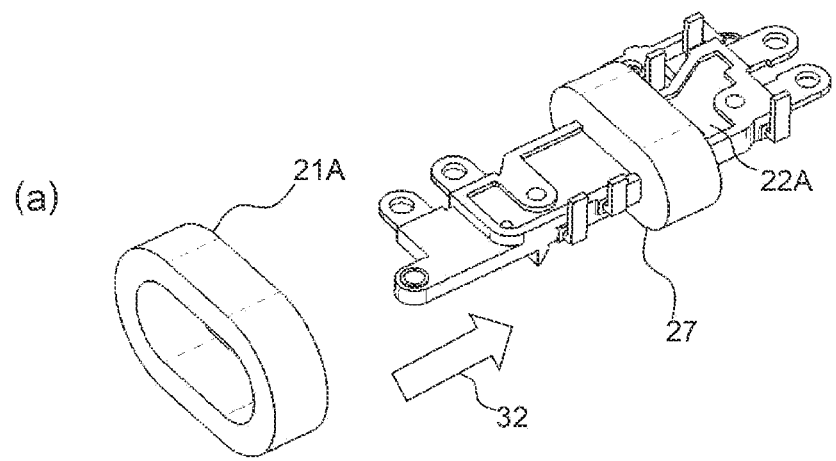
FIG. 7 is a diagram explaining assembly in which the resin portion is provided in the filter portion of FIG. 6.
Figure 7:
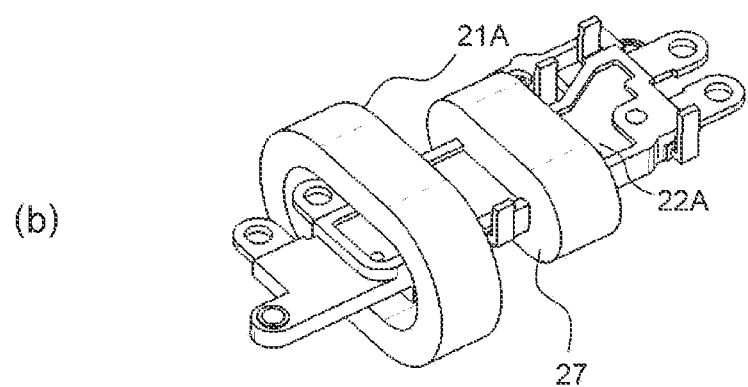
Figure 7:
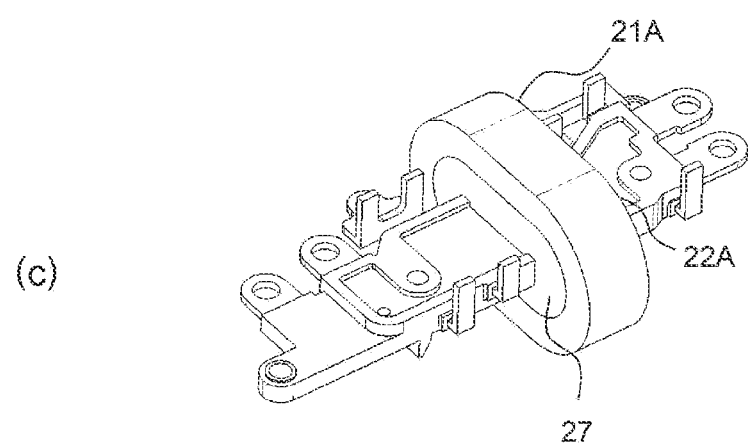

FIGS. 6 and 7 illustrate an assembly process of the filter portion according to one embodiment of the present invention. FIG. 6 illustrates an assembly process of the filter portion 20 illustrated in FIG. 3, and FIG. 7 illustrates an assembly process of the filter portion 20A illustrated in FIG. 4.

As illustrated in FIGS. 6 and 7, at the time of assembling the cores 21 and 21A respectively in the filter portions 20 and 20A, the EMC bus bars 22 and 22A can be respectively inserted into the through holes of the cores 21 and 21A along an insertion direction 32 without using split cores. FIG. 7 illustrates a procedure in which the resin portion 27 is molded around the EMC bus bar 22A before the assembly and insertion of the core 21A, and then the resin portion 27 is fitted into the through hole of the core 21A. That is, the resin portion 27 serves as a core holding portion that is used for fitting the EMC bus bar 22A into the through hole of the core 21A and holds the core 21A. Thus, the stability of the filter portion 20A can be obtained.

Note that the cores 21 and 21A are larger than the round core used in the conventional technique by the size of the flat surface portion 26, but can be assembled as in the present invention, which contributes to downsizing of the entire inverter.

According to one embodiment described above, the following operational effects can be obtained.

(1) The power conversion device 1 includes the direct-current bus bar 22 that transmits a direct current, the capacitor element 14 for filter connected to the direct-current bus bar 22, and the magnetic core 21 that has the through hole through which the direct-current bus bar 22 is inserted and is constituted by a single member. The through hole is formed in the magnetic core 21 such that the inner diameter 28 along the width direction of the direct-current bus bar 22 is longer than the inner diameter 29 orthogonal to the inner diameter 28. This can provide the power conversion device 1 that achieves both the cooling performance and the downsizing while achieving the improvement in the noise removal performance.

(2) The magnetic core 21 of the power conversion device 1 has the flat surface portion 26 along the inner diameter 28 on the outer peripheral surface, and is placed on the case 18 as a heat dissipation member with the flat surface portion 26 being interposed therebetween. This eliminates the complexity of the placement place that occurs when a conventional round core is placed, thus making the assembly easy.

(3) The inner diameter 28 of the magnetic core 21 is larger than the positive-negative electrode terminal distance 31 of the capacitor element 14 for filter. Thus, the core 21 can be easily assembled.

(4) The power conversion device 1 includes the resin sealing member 27 that integrally seals the direct-current bus bar 22A having the stacked structure. The resin sealing member 27 is disposed in the through hole of the magnetic core 21A together with the direct-current bus bar 22A. This enhances the fixability between the core 21A and the bus bar 22A and the reliability as the filter portion 20A.

(5) The dimension of the cross section of the direct-current bus bar 22 of the power conversion device 1 is shorter than the short inner diameter 29 and the long inner diameter 28. Thus, the core 21 can be easily assembled.

(6) The resin sealing member 27 of the power conversion device 1 is a core holding portion that makes the direct-current bus bar 22A fit into the through hole of the magnetic core 21A and holds the magnetic core 21A. This enhances the fixability between the core 21A and the bus bar 22A and the reliability as the filter portion 20A.

Note that, the embodiment of the present invention described above have described the example in which the magnetic cores 21 and 21A have an oval shape (a rounded rectangular shape in which a pair of opposing sides are arc-shaped) illustrated in FIGS. 3, 4, and the like, but may have other shapes. For example, both of two pairs of sides facing each other may have a linear shape, and a vertex portion may have a rounded rectangular shape formed in an arc shape, an elliptical shape having no linear portion, or the like. In addition to this, the magnetic cores 21 and 21A can be formed into any shape as long as the through holes are formed into a shape in which one of two inner diameters orthogonal to each other becomes long.

Although described above, deletion, replacement with another configuration, and addition of another configuration can be made without departing from the technical idea of the invention, and aspects thereof are also included in the scope of the present invention. Furthermore, a configuration in which the above-described embodiment is combined with a plurality of modified examples may be adopted.

Reference Signs List 1 power conversion device
11 power conversion module
12 direct-current bus bar
13 X capacitor
14 Y capacitor
15 filter circuit
18 housing case
19 direct-current power supply input unit
20 EMC filter portion
21 EMC core
22 EMC bus bar
23 welding rib
24 water channel
25 GND bus bar
26 flat surface portion
27 resin portion
28 inner diameter of through hole in longitudinal direction
29 inner diameter of through hole in transverse direction
30 width of direct-current bus bar in cross-sectional longitudinal direction
31 positive-negative electrode terminal distance of capacitor element for filter
32 insertion direction of EMC core
33 positioning rib

The invention claimed is:

1. A power conversion device comprising:
a direct-current bus bar that transmits a direct current;
a capacitor element for filter connected to the direct-current bus bar; and
a magnetic core that has a through hole into which the direct-current bus bar is inserted and is configured by a single member,
wherein the through hole is disposed in the magnetic core to have a first inner diameter along a width direction of the direct-current bus bar and a second inner diameter orthogonal to the first inner diameter, the first inner diameter being larger than the second inner diameter, and the first inner diameter is larger than a distance between positive and negative electrode terminals of the capacitor element for filter.

2. The power conversion device according to claim 1, wherein the magnetic core has a flat surface portion along the first inner diameter on an outer peripheral surface, and is placed on a heat dissipation member with the flat surface portion being interposed between the magnetic core and the heat dissipation member.

3. The power conversion device according to claim 1, further comprising:
a resin sealing member that integrally seals the direct-current bus bar having a stacked structure,
wherein the resin sealing member is disposed in the through hole together with the direct-current bus bar.

4. The power conversion device according to claim 1, wherein the direct-current bus bar has a cross section smaller in dimension than the first inner diameter in a direction along the first inner diameter and smaller than the second inner diameter in a direction along the second inner diameter.

5. The power conversion device according to claim 3, wherein the resin sealing member includes a core holding portion that makes the direct-current bus bar fit into the through hole and holds the magnetic core.

* * * * *